(12) United States Patent
Sabbani et al.

(10) Patent No.: US 10,453,225 B2
(45) Date of Patent: Oct. 22, 2019

(54) SYSTEM AND METHOD FOR CONVERTING PATH TERMINATORS TO DRAWING COMMANDS AND FILLING THE VOIDS BETWEEN FLIGHT PATH SEGMENTS

(71) Applicant: HONEYWELL INTERNATIONAL INC., Morris Plains, NJ (US)

(72) Inventors: Ramesh Sabbani, Andhrapradesh (IN); Nisaruddin Khaja, Telangana (IN); Kiran Perikala, Telangana (IN); Don Nicholas, Phoenix, AZ (US); Savithri Panidepu, Telangana (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 117 days.

(21) Appl. No.: 15/485,324

(22) Filed: Apr. 12, 2017

(65) Prior Publication Data
US 2018/0300911 A1    Oct. 18, 2018

(51) Int. Cl.
*G06T 11/20* (2006.01)
*G06F 16/16* (2019.01)
(Continued)

(52) U.S. Cl.
CPC .......... *G06T 11/203* (2013.01); *G01C 23/005* (2013.01); *G06F 16/168* (2019.01); *G08G 5/0021* (2013.01); *G08G 5/0034* (2013.01); *G08G 5/0047* (2013.01); *B64D 45/00* (2013.01); *G08G 5/0039* (2013.01);
(Continued)

(58) Field of Classification Search
CPC ..... G06T 11/203; G06F 16/168; B64D 45/00; G01C 23/005; G08G 5/0021; G08G 5/0034; G08G 5/0047; G08G 5/0039; G08G 5/0056; G08G 5/025; H04L 2012/4028
See application file for complete search history.

(56) References Cited

U.S. PATENT DOCUMENTS 7,640,082 B2 * 12/2009 Dwyer .................. G01C 23/00
                                                340/945
7,876,238 B2   1/2011 Vanderbergh et al.
(Continued)

OTHER PUBLICATIONS

Extended EP Search Report for Application No. 18165803.0 dated Aug. 24, 2018.
(Continued)

*Primary Examiner* — Jwalant Amin
(74) *Attorney, Agent, or Firm* — Lorenz & Kopf, LLP

(57) ABSTRACT

Methods and apparatus are provided for drawing an image of a procedure route. The method comprises retrieving a source data file containing flight path data formatted in accordance with an industry standard wherein the flight path data comprises a plurality of path data items and a plurality of terminator data items, the path data items and the terminator data items are arranged in pairs as a plurality of path and terminator data item pairs, and the path and terminator data item pairs have a specific order. The method further comprises converting each path and terminator data item pair in the source data file to one or more drawing commands comprising one or more of a point command, a line command, or a curve command. The method further comprises storing the drawing commands converted from the path and terminator data item pairs in a database file.

20 Claims, 6 Drawing Sheets

(51) Int. Cl.
  *G01C 23/00* (2006.01)
  *G08G 5/00* (2006.01)
  *H04L 12/40* (2006.01)
  *B64D 45/00* (2006.01)
  *G08G 5/02* (2006.01)

(52) U.S. Cl.
  CPC ........... *G08G 5/0056* (2013.01); *G08G 5/025* (2013.01); *H04L 2012/4028* (2013.01)

(56) References Cited

U.S. PATENT DOCUMENTS

| | | |
|---|---|---|
| 7,965,202 B1 | 6/2011 | Chiew et al. |
| 8,630,754 B2 | 1/2014 | Coulmeau et al. |
| 8,725,320 B1 * | 5/2014 | Pschierer ............... G01C 23/00 701/30.4 |
| 9,354,077 B2 | 5/2016 | Srivastav et al. |
| 2003/0088360 A1 | 5/2003 | Ikhlef et al. |
| 2006/0142904 A1 | 6/2006 | Caillaud et al. |
| 2007/0016345 A1 * | 1/2007 | Plogmann ............ G01C 23/005 701/3 |
| 2007/0233331 A1 | 10/2007 | Caillaud et al. |
| 2011/0172914 A1 * | 7/2011 | Coulmeau ............ G08G 5/0034 701/532 |
| 2017/0315706 A1 * | 11/2017 | Helppi ................. G06F 3/04845 |

OTHER PUBLICATIONS

Dr. Maarten Uijt De Haag; EE6900 Flight Management Systems "Databases"; Ohio University (http://www.ohio.edu/).

CASA Australia, ICAO, and COSCAP; Performance Based Navigation Operational Approval Handbook; ICAO (http://www.icao.int/).

Randy Walter, Smiths Industries; Flight Management Systems; © 2001 by CRC Press LLC.

Burdette Dan G.; Navigation Database Validation; 14th SIIV IFIS Toulouse-France Jun. 12-16, 2006.

* cited by examiner

SYSTEM AND METHOD FOR CONVERTING PATH TERMINATORS TO DRAWING COMMANDS AND FILLING THE VOIDS BETWEEN FLIGHT PATH SEGMENTS

TECHNICAL FIELD

The technology described in this patent document relates generally to terminal charts and more particularly to generating terminal charts from standard data.

BACKGROUND

A terminal chart is a map that provides the image of a procedure route and is designed to assist pilots in navigating aircraft. Pilots can use terminal charts and other tools to determine an aircraft's position, safe altitude, best route to a destination, navigation aids along the way, alternative landing areas in case of an in-flight emergency, and other useful information such as radio frequencies and airspace boundaries. Currently these terminal charts are provided in the form of physical papers or in a portable document format (pdf). The terminal charts are not updated frequently and can become out of date.

Navigational data may be updated more frequently than terminal charts and are supplied from various suppliers using the ARINC 424 format. ARINC 424 is an international standard file format for aircraft navigation data maintained by Airlines Electronic Engineering Committee and published by Aeronautical Radio, Inc. The ARINC 424 specifications provide a standard for the preparation and transmission of data for assembly of airborne navigation system databases. ARINC 424 specifies a 132-byte fixed-length record format. Each record consists of one piece of navigation information such as an airport, heliport, runway, waypoints, Navaid, airways, arrival routes, and departure routes. ARINC 424 data is not natively displayable as a terminal chart and lacks certain details shown in a terminal chart.

Accordingly, it is desirable to provide a system for providing the image of a procedure route as depicted in a terminal chart that is derived from navigational data provided in an industry standard format.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method of drawing an image of a procedure route is provided. The method includes retrieving a source data file containing flight path data formatted in accordance with an industry standard wherein the flight path data includes a plurality of path data items and a plurality of terminator data items, the path data items and the terminator data items are arranged in pairs as a plurality of path and terminator data item pairs, and the path and terminator data item pairs have a specific order. The method further includes converting, without using operational aircraft data, each path and terminator data item pair in the source data file to one or more drawing commands including one or more of a point command, a line command, or a curve command wherein the point command when executed causes the display of a point on a display system, the line command when executed causes the display of a line on the display system, and the curve command when executed causes the display of a curve on the display system. The method further includes storing the drawing commands converted from the path and terminator data item pairs in a database file.

A system for drawing an image of a procedure route is provided. The system includes a database system for storing industry standard drawing commands in one or more files wherein the drawing commands are configured to cause a computing device to draw an image of a procedure route on a display device and a processing environment including one or more processors configured to generate the drawing commands and store the drawing commands in the one or more files in the database system. The one or more processors are configured to retrieve a source data file containing flight path data formatted in accordance with an industry standard wherein the flight path data includes a plurality of path data items and a plurality of terminator data items, the path data items and the terminator data items are arranged in pairs as a plurality of path and terminator data item pairs, and the path and terminator data item pairs have a specific order. The one or more processors are further configured to convert, without using operational aircraft data, each path and terminator data item pair in the source data file to one or more drawing commands including one or more of a point command, a line command, or a curve command wherein the point command when executed causes the display of a point on a display system, the line command when executed causes the display of a line on the display system, and the curve command when executed causes the display of a curve on the display system. The one or more processors are further configured to store the drawing commands converted from the path and terminator data item pairs in a database file.

BRIEF DESCRIPTION OF THE DRAWINGS

Aspects of the present disclosure are best understood from the following detailed description when read with the accompanying figures, wherein like numerals denote like elements.

DETAILED DESCRIPTION

The subject matter described herein discloses apparatus, systems, techniques and articles for processing standard navigational data and generating drawing commands for displaying a procedure route. The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1:
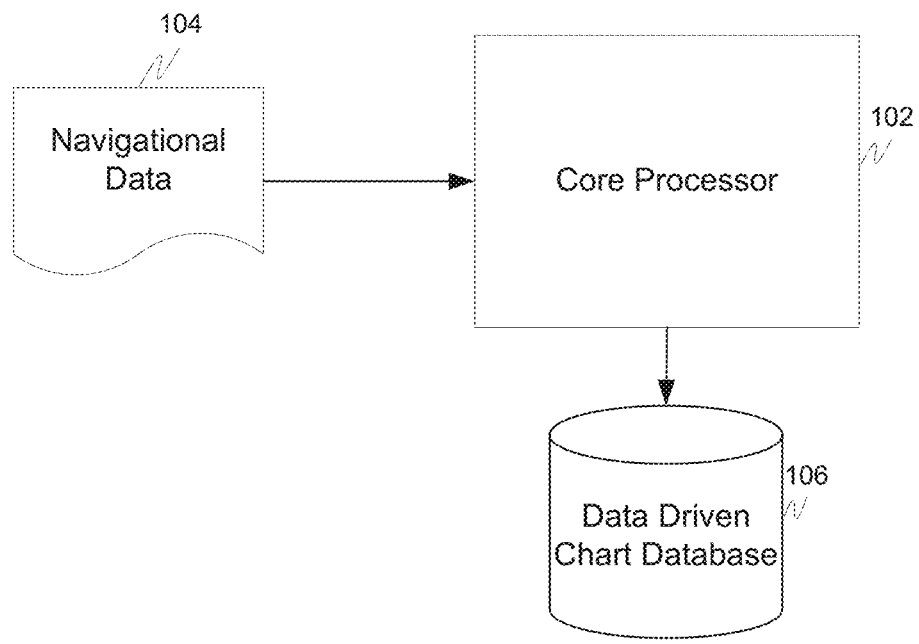
FIG. 1 is a block diagram depicting an example system for generating a database of terminal charts of a procedure route from standard aircraft navigation data, in accordance with some embodiments.

FIG. 1 is a block diagram depicting an example system for generating a database of terminal charts of procedure routes from standard aircraft navigation data. These terminal charts, which are generated from standard aircraft navigation data, are referred to herein as data driven charts. The example system includes a computer-implemented core processor 102 that comprises one or more processors and is configured by computer programming instructions. The computer-implemented core processor 102 is configured to retrieve a source data file 104 containing navigational or flight path data formatted in accordance with an industry standard. The industry standard, in this example, is the ARINC 424 standard. The source data files 104 may be provided by a variety of aeronautical navigational database suppliers. In this example, the data files may be of two different types, a 132-byte fixed-length ARINC 424 standard text file and an XML, based data file. The flight path data comprises a plurality of path data items and a plurality of terminator data items. The path data items and the terminator data items are arranged in pairs as a plurality of path and terminator data item pairs. The path and terminator data item pairs are arranged in a specific order.

An industry standard set of defined codes referred to as path and terminators exists. Each code defines a specific type of flight path and a specific type of termination of that flight path. Table 1 shown below provides a listing of twenty-three (23) types of path and terminator pairs.

TABLE 1

| ARINC 424 Path and terminators | | |
|---|---|---|
| S. NO | PT Description | PT Acronym |
| 1 | Arc to a Fix | AF |
| 2 | Course to an Altitude | CA |

TABLE 1-continued

| ARINC 424 Path and terminators | | |
|---|---|---|
| S. NO | PT Description | PT Acronym |
| 3 | Course to a DME Distance | CD |
| 4 | Course to a Fix | CF |
| 5 | Course to an Intercept | CI |
| 6 | Course to a Radial Termination | CR |
| 7 | Direct to a Fix | DF |
| 8 | Fix to an Altitude | FA |
| 9 | From a Fix for a Distance | FC |
| 10 | From a Fix to a DME Distance | FD |
| 11 | From a Fix to a Manual termination | FM |
| 12 | Holding to Altitude Termination | HA |
| 13 | Holding to Single circuit terminating at the fix. | HF |
| 14 | Holding to Manual Termination. | HM |
| 15 | Initial Fix | IF |
| 16 | Procedure Turn | PI |
| 17 | Constant Radius Arc | RF |
| 18 | Track to a Fix | TF |
| 19 | Heading to an Altitude | VA |
| 20 | Heading to a DME Distance | VD |
| 21 | Heading to an Intercept | VI |
| 22 | Heading to a Manual Termination- | VM |
| 23 | Heading to a Radial Termination | VR |

Figure 2:
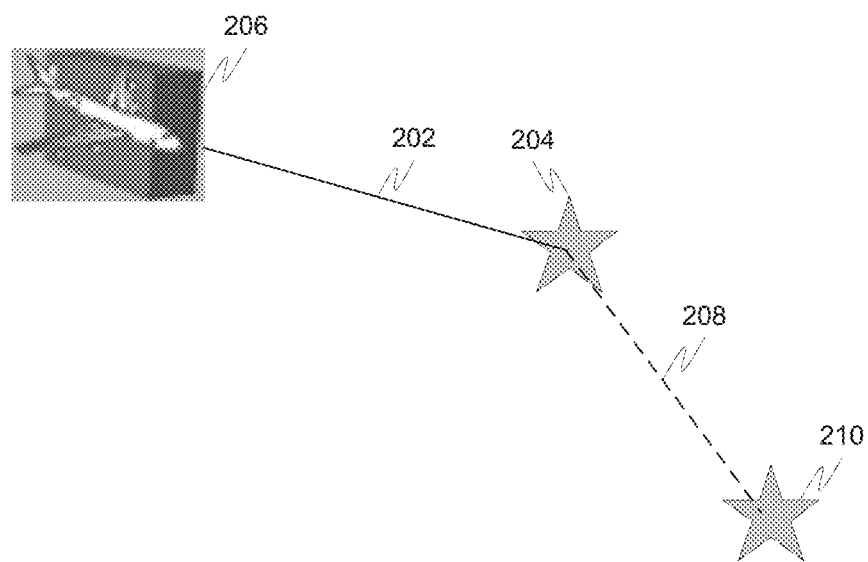
FIG. 2 is diagram illustrating example path and terminator data item pairs, in accordance with some embodiments.

FIG. 2 is diagram illustrating example path and terminator data item pairs. A current data item pair comprising a path data item 202 and a terminator data item 204 are depicted, respectively, by a straight line 202 and a star 204. The starting point 206 of the current path 202 is the terminator data item of a previous path and terminator data item pair. The starting point of a next path data item 208 begins at the terminator data item 204 of the current data item pair and the end point of the next path data item 208 is the terminator data item 210 of the next path data item pair.

Referring again to FIG. 1, the computer-implemented core processor 102 can generate a navigational database of files containing executable drawing commands for drawing data driven charts of a procedure route on display systems. The computer-implemented core processor 102 can generate the data driven chart by converting, without using operational aircraft data, each path and terminator data item pair in a source data file 104 to one or more drawing commands.

Each path and terminator input procedure record (i.e., path and terminator data item pair) in a source file is converted to one or more drawing commands and provided with other flight details. The drawing commands may comprise one or more of a point command, a line command, or a curve command. The flight details may include latitude, longitude, course, and altitude, among others.

The point command when executed causes a point to be drawn on a display system. The line command when executed causes a line to be drawn on a display system. The curve command when executed causes a curve to be drawn on a display system. The computer-implemented core processor 102 is also configured to store the drawing commands converted from the path and terminator data item pairs in a database file in data driven chart database 106.

Table 2, shown below, lists the types of drawing commands that are generated for each flight leg to display a path and terminator data item pair on a display screen. As an example, for the AF leg, a point drawing command and a curve drawing command will be generated.

TABLE 2

Path and Terminators Conversion to Drawing Commands

| S. NO | PT Acronym | Normal | Previous leg Course Difference <30 | Previous leg Course Difference >30 | Next leg Course Difference >30 |
|---|---|---|---|---|---|
| 1 | AF | Point, Curve | | | |
| 2 | CA | Point, Line | | Curve | |
| 3 | CD | Point, Line | | Curve | |
| 4 | CF | Point, Line | | Curve | |
| 5 | CI | Point, Line | | Curve | |
| 6 | CR | Point, Line | | Curve | Curve |
| 7 | DF | Point, Line | | Curve | |
| 8 | FA | Point, Line | | Curve | Curve |
| 9 | FC | Point, Line | | | |
| 10 | FD | Point | Line | Curve | |
| 11 | FM | Point, Line | | | |
| 12 | HA | Point, Holding Pattern | | | |
| 13 | HF | Point, Holding Pattern | | | |
| 14 | HM | Point, Holding Pattern | | | |
| 15 | IF | Point | | | |
| 16 | PI | Point, Procedure Turn | | | |
| 17 | RF | Point, Curve | | | |
| 18 | TF | Point | Line | Curve | |
| 19 | VA | Point, Line | | Curve | Curve |
| 20 | VD | Point, Line | | Curve | |
| 21 | VI | Point, Line | | Curve | |
| 22 | VM | Point, Line | | Curve | |
| 23 | VR | Point, Line | | Curve | Curve |

As another example, Table 2 illustrates that, for a CR leg, a point drawing command and a line drawing command will be generated. If the course difference between the CR leg and the previous leg is greater than a threshold level of 30 degrees, then a curve drawing command will also be generated. Also, if the course difference between the CR leg and the next leg course is greater than a threshold level of 30 degrees, a curve drawing command will be generated.

As an additional example, for the FD leg, a point drawing command will be generated. If the course difference between the FD leg and the previous leg is less than a threshold level of 30 degrees, then a line drawing command will also be generated. But, if the course difference between the FD leg and the previous leg is greater than a threshold level of 30 degrees, a curve drawing command will be generated.

The consideration of the degree of course differences between the previous, current, and next flight legs may allow for one or more additional drawing commands to be generated to smooth out transitions between flight path legs. This allows the data driven charts to more accurately approximate a desired flight path. A threshold of thirty (30) degrees was chosen in these examples as the criteria for determining whether an extra drawing command should be added to smooth out transitions between legs. In other examples, a different threshold level may be chosen.

Figure 3A:
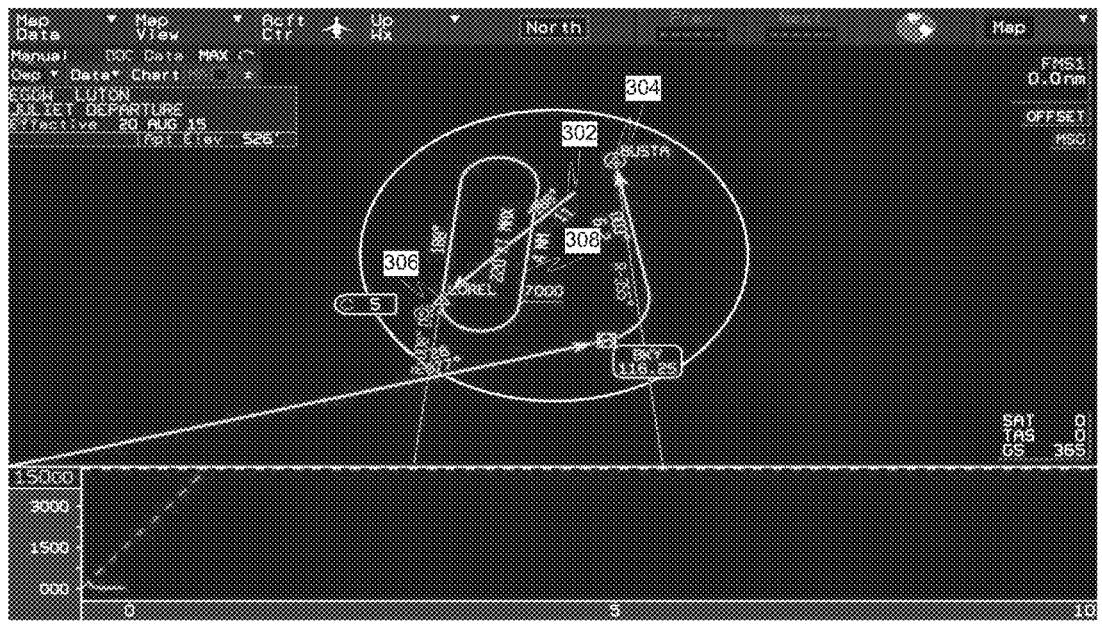
FIG. 3A depicts an example screenshot of an example data driven chart without the smoothening of transitions between flight path legs, in accordance with some embodiments.

FIG. 3A depicts an example screenshot of an example data driven chart without the smoothening of transitions between flight path legs. In this example, a straight line 302 is drawn resulting from the execution a line drawing command between the BUSTA path terminator 304 and the LOREL path terminator 306. In this example screenshot, smooth transitions do not exist between the BUSTA path terminator 304, the LOREL path terminator 306, or the holding pattern 308.

Figure 3B:
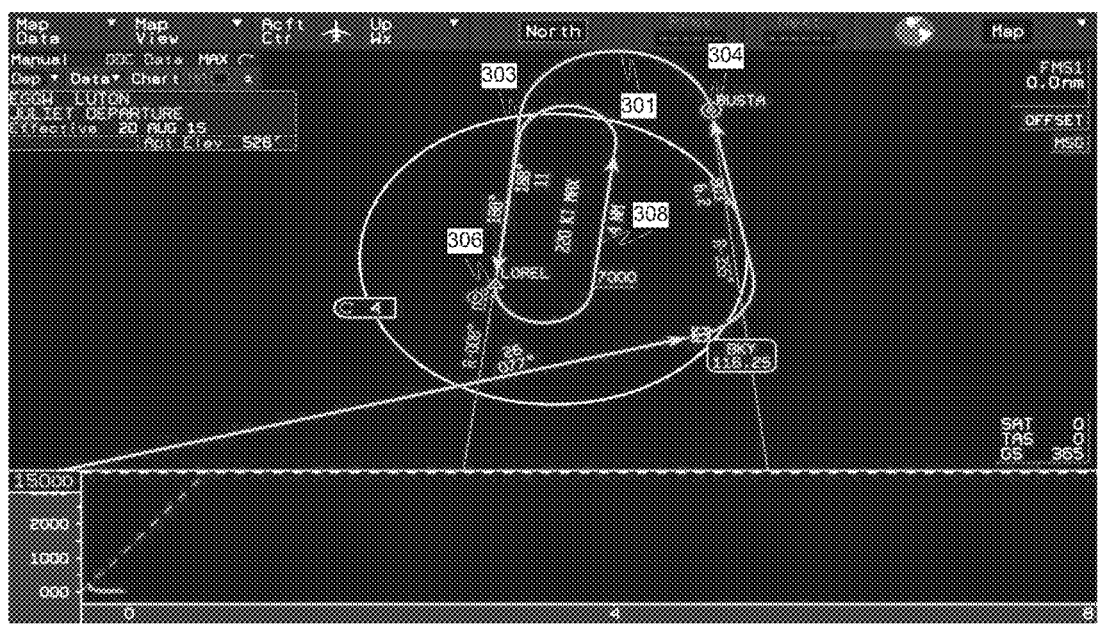
FIG. 3B depicts an example screenshot of an example data driven chart with the smoothening of transitions between flight path legs, in accordance with some embodiments.

FIG. 3B depicts an example screenshot of an example data driven chart with the smoothening of transitions between flight path legs. In this example, a curved line 301 and a straight line 303 are drawn resulting from the execution of a curve drawing command and a line drawing command between the BUSTA path terminator 304 and the LOREL path terminator 306 before entering a holding pattern path 308. In this example screenshot, smooth transitions do exist between the BUSTA path terminator 304, the LOREL path terminator 306, and the holding pattern 308.

Figure 4:
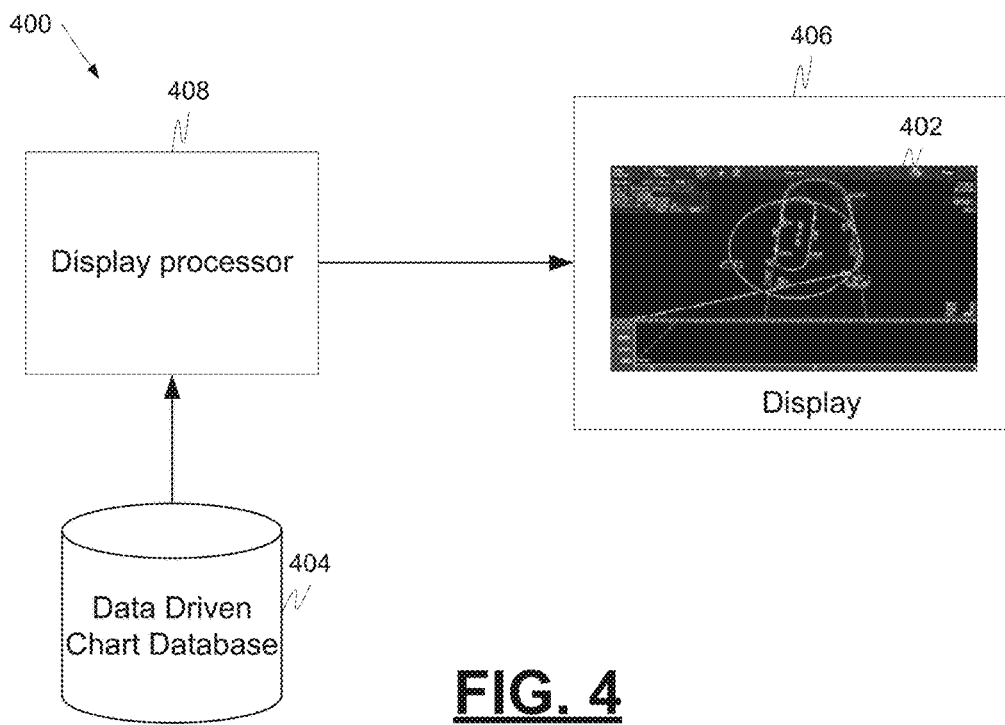
FIG. 4 is a block diagram depicting an example system for displaying a data driven chart stored in a data driven charts database as drawing commands on a display, in accordance with some embodiments.

FIG. 4 is a block diagram depicting an example system 400 for displaying a data driven chart 402 stored in a data driven charts database 404 as drawing commands on a display 406. A display processor 408 comprising one or more processors configured by computer programming instructions can execute the drawing commands to display the data driven chart 402 on the display 406. The display 406 may be one of many types of displays such as a computer display or an aircraft cockpit display. The data driven chart 402 may be displayed in an aircraft while in flight or on the ground or on a device unrelated to an aircraft.

Figure 5:
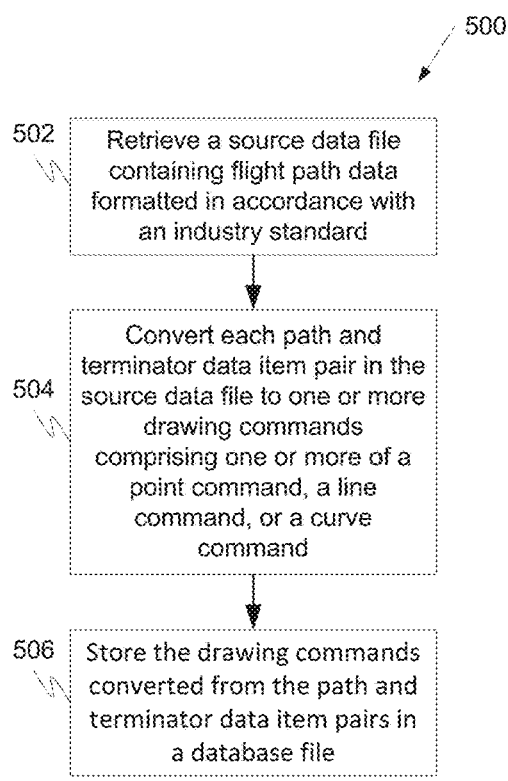
FIG. 5 is a process flow chart depicting an example process for generating a database of data driven charts from standard aircraft navigation data, in accordance with some embodiments.

FIG. 5 is a process flow chart depicting an example process 500 for generating a database of data driven charts from standard aircraft navigation data. The example process 500 includes retrieving a source data file containing flight path data formatted in accordance with an industry standard (operation 502). The flight path data comprises a plurality of path data items and a plurality of terminator data items. The path data items and the terminator data items are arranged in pairs as a plurality of path and terminator data item pairs. The path and terminator data item pairs have a specific order.

The example process 500 also includes converting, without using operational aircraft data, each path and terminator data item pair in the source data file to one or more drawing commands comprising one or more of a point command, a line command, or a curve command (operation 504). The point command when executed draws a point on a display system. The line command when executed draws a line on the display system. The curve command when executed draws a curve on the display system. The example process 500 additionally includes storing the drawing commands converted from the path and terminator data item pairs in a database file (operation 502). The industry standard in this example is the ARINC 424 standard. The drawing commands may be determined based on a current path and terminator data item pair, a previous path and terminator data item pair, and a next path and terminator data item pair.

Each path and Terminator data item pair can be converted to point, line and curve drawing commands. The choice of drawing commands can be determined based on a consideration of the current path and terminator data item pair, the previous path and terminator data item pair, and the next path and terminator data item pair. The number and type of drawing commands for each record depends on the type of path and terminator data item pairs and flight details such as course, distance, altitude, speed, and others.

Each drawing command may be stored in a database file in a record related to the drawing command type. As an example, a point command may be stored in a point record, a line command may be stored in a line record, and a curve command may be stored in a curve record along with other flight data.

In this example, a point record includes context information related to a fix appearing in the procedure route. The point record contains information regarding on/off route fixes that form the terminal procedure. The point record may also include flight details such as altitude, speed restriction, fix identifiers, radial formations, latitude and longitude.

In this example, a line record provides information regarding on-route chart straight segments. The line record may also include flight details such as altitude, course, distance, speed restriction, line starting latitude and longitude, and line ending latitude and longitude.

In this example, a curve record provides information regarding on-route chart curved paths that are formed by distances measured by distance measuring equipment (DME) or curved path transitions. The curve record may also include flight details such as altitude, course, distance, speed restriction, curve starting latitude and longitude, curve center latitude and longitude and curve ending latitude and longitude.

In addition to the point, line and curve commands, a holding pattern command or a procedure turn command may be used. A holding pattern command may be used for HA, HF and HM path and terminator data item pairs and a procedure turn command may be used for PI path and terminator data item pairs.

Figure 6:
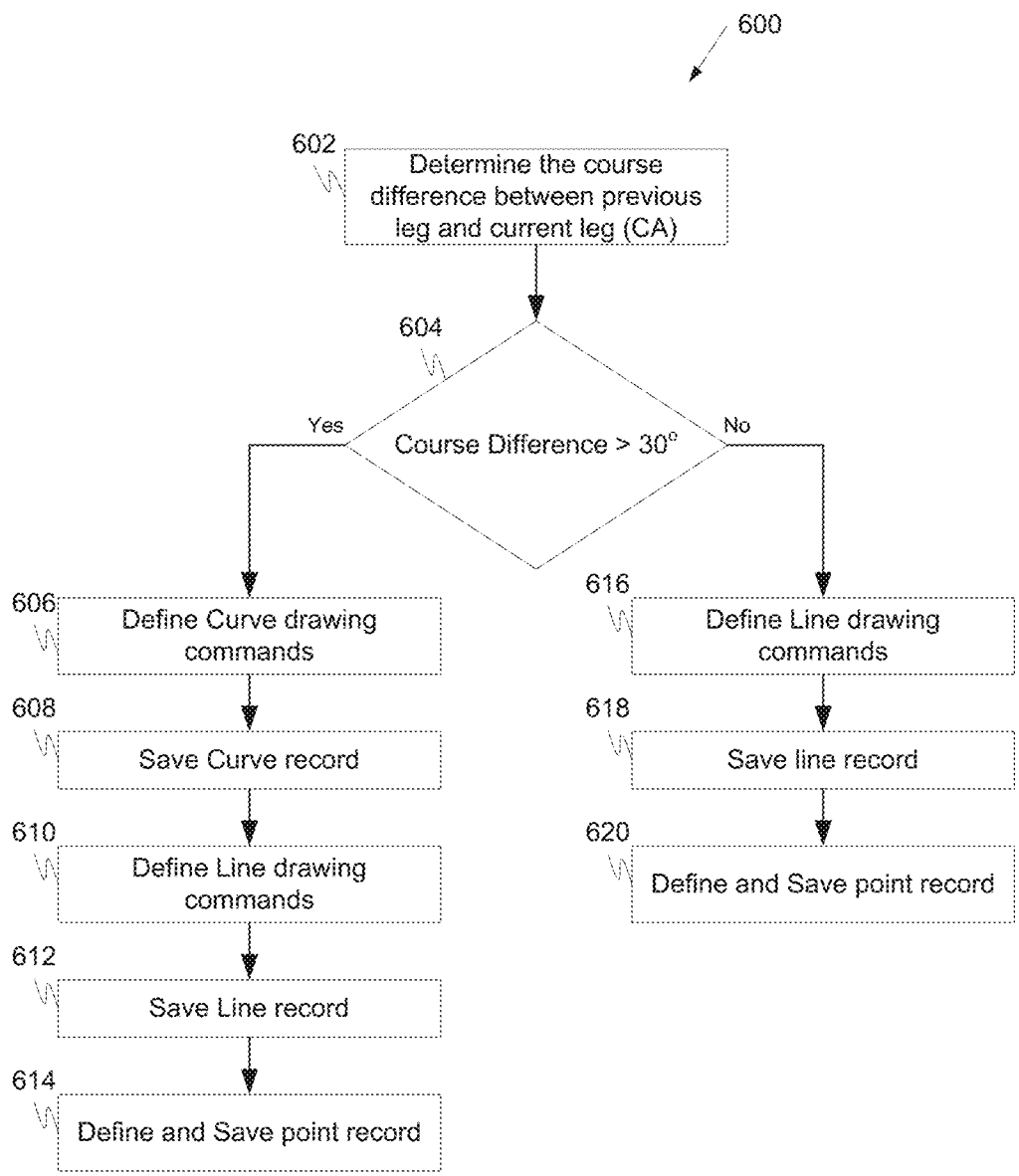
FIG. 6 is a process flow chart depicting an example process for generating drawing commands for a current leg of a CA procedure, in accordance with some embodiments.

FIG. 6 is a process flow chart depicting an example process 600 for generating drawing commands for a current leg of a CA procedure. The example process 600 includes determining the course difference between the previous leg and the current leg (operation 602). After determining the course difference, the example process 600 includes deciding whether the course difference is greater than a threshold level of thirty degrees (decision 604). If the course difference is greater than the threshold level of thirty degrees (yes at decision 604), a curve drawing command is defined (operation 606) and a curve record is saved (operation 608). A line drawing command is defined (operation 610) and a line record is saved (operation 612). Also, a point is defined and a point record is saved (operation 614). If the course difference is not greater than the threshold level of thirty degrees (no at decision 604), a line drawing command is defined (operation 616) and a line record is saved (operation 618). Also, a point is defined and a point record is saved (operation 620).

Figure 7:
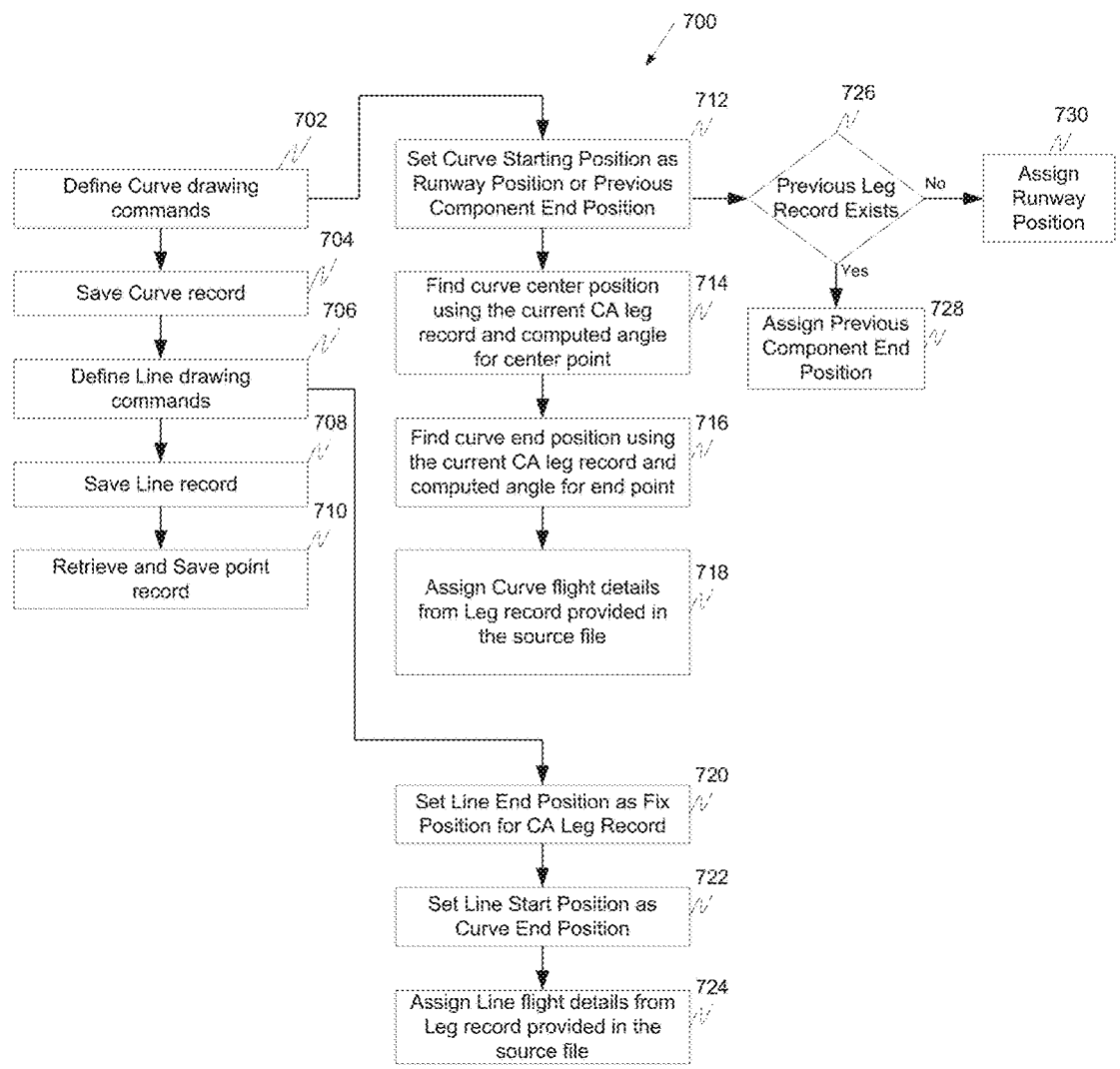
FIG. 7 is a process flow chart depicting another example process for generating drawing commands for a current leg of a CA procedure when the course difference between the previous leg and the current leg is greater than a threshold level of thirty degrees, in accordance with some embodiments.

FIG. 7 is a process flow chart depicting another example process 700 for generating drawing commands for a current leg of a CA procedure when the course difference between the previous leg and the current leg is greater than a threshold level of thirty degrees. The example process 700 includes defining a curve drawing command (operation 702) and saving a curve record (operation 704). The example process 700 further includes defining a line drawing command (operation 706) and saving a line record (operation 708). Also, a point is defined and a point record is saved (operation 710).

Defining a curve drawing command (operation 702), in this example, involves setting the curve starting position as the runway position or a previous drawing command end position (operation 712), finding the curve center position using the current CA leg record and a computed angle for the center point (operation 714), finding the curve end position using the current CA leg record and a computed angle for end point (operation 716), and assigning curve flight details from the source file (operation 718). The flight details may include altitude, course, distance, speed restriction, line starting latitude and longitude, and line ending latitude and longitude and may be derived from the source file.

Defining a line drawing command (operation 706), in this example, involves setting the line end position as the fix position for the CA leg record (operation 720), setting the line start position as the curve end position (operation 722), and assigning line details (operation 724). The flight details may include altitude, course, distance, speed restriction, line starting latitude and longitude, and line ending latitude and longitude and may be derived from the source file.

Setting the curve starting position (operation 712) may involve deciding whether a previous leg record exists (decision 726). If a previous leg record exists (yes at decision 726), then the end position of the previous leg may be set as the curve starting position (operation 728). If a previous leg record does not exist (no at decision 726), then a runway position may be set as the curve starting position (operation 730).

Figure 8:
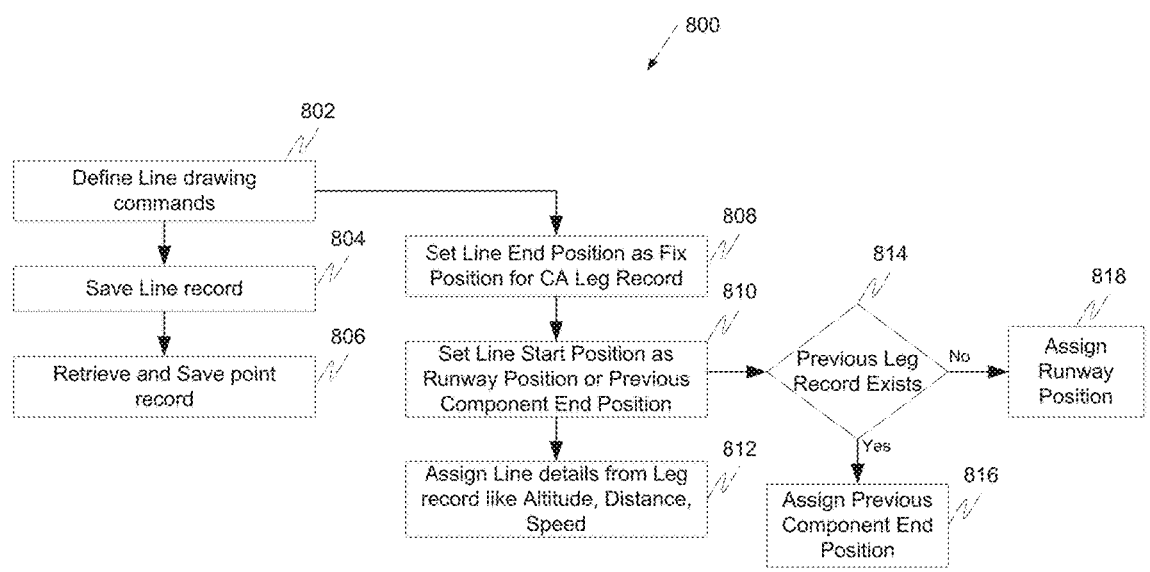
FIG. 8 is a process flow chart depicting another example process for generating drawing commands for a current leg of a CA procedure when the course difference between the previous leg and the current leg is not greater than a threshold level of thirty degrees, in accordance with some embodiments.

FIG. 8 is a process flow chart depicting another example process 800 for generating drawing commands for a current leg of a CA procedure when the course difference between the previous leg and the current leg is not greater than a threshold level of thirty degrees. The example process 800 includes defining a line drawing command (operation 802), saving a line record (operation 804), and defining and saving a point record (operation 806).

Defining a line drawing command (operation 802), in this example, involves setting the line end position as the fix position for the CA leg record (operation 808), setting the line start position as the runway position or a previous drawing command end position (operation 810), and assigning line details from a source file (operation 812). The flight details may include altitude, course, distance, speed restriction, line starting latitude and longitude, and line ending latitude and longitude and may be derived from the source file.

Setting the line start position (operation 810) may involve deciding whether a previous leg record exists (decision 814). If a previous leg record exists (yes at decision 814), then the end position of the previous leg may be set as the line start position (operation 816). If a previous leg record does not exist (no at decision 814), then a runway position may be set as the line starting position (operation 818).

Described herein are techniques for generating terminal charts using supplier generated source data files. The techniques can provide a pilot with direct access to worldwide terminal charts that may be displayed in cockpit display systems and updated as frequently as desired.

In one embodiment, a method of drawing an image of a procedure route is provided. The method comprises retrieving a source data file containing flight path data formatted in accordance with an industry standard wherein the flight path data comprises a plurality of path data items and a plurality of terminator data items, the path data items and the terminator data items are arranged in pairs as a plurality of path and terminator data item pairs, and the path and terminator data item pairs have a specific order. The method further comprises converting, without using operational aircraft data, each path and terminator data item pair in the source data file to one or more drawing commands comprising one or more of a point command, a line command, or a curve command wherein the point command when executed causes the display of a point on a display system, the line command when executed causes the display of a line on the display system, and the curve command when executed causes the display of a curve on the display system. The method further comprises storing the drawing commands converted from the path and terminator data item pairs in a database file.

These aspects and other embodiments may include one or more of the following features. The industry standard may comprise the ARINC 424 standard. The drawing commands may be determined based on a current path and terminator data item pair, a previous path and terminator data item pair, and a next path and terminator data item pair. Converting each path and terminator data item pair to one or more drawing commands may comprise determining the course difference between the previous leg and the current leg. The method may further comprise defining a curve drawing command, a line drawing command, and a point drawing command if the course difference is greater than a threshold level of thirty degrees. The method may further comprise defining a line drawing command and a point drawing command and not a curve drawing command if the course difference is not greater than a threshold level of thirty degrees. Defining a curve drawing command may comprise defining a curve start position, a curve end position, and a curve center position. Defining a line drawing command may comprise defining a line start position and a line end position. The curve start position may be a runway position or the end position of a previous drawing command. The line start position may be a curve end position.

In another embodiment, a system for drawing an image of a procedure route is provided. The system comprises a database system for storing industry standard drawing commands in one or more files wherein the drawing commands are configured to cause a computing device to draw an image of a procedure route on a display device and a processing environment comprising one or more processors configured to generate the drawing commands and store the drawing commands in the one or more files in the database system. The one or more processors are configured to retrieve a source data file containing flight path data formatted in accordance with an industry standard wherein the flight path data comprises a plurality of path data items and a plurality of terminator data items, the path data items and the terminator data items are arranged in pairs as a plurality of path and terminator data item pairs, and the path and terminator data item pairs have a specific order. The one or more processors are further configured to convert, without using operational aircraft data, each path and terminator data item pair in the source data file to one or more drawing commands comprising one or more of a point command, a line command, or a curve command wherein the point command when executed causes the display of a point on a display system, the line command when executed causes the display of a line on the display system, and the curve command when executed causes the display of a curve on the display system. The one or more processors are further configured to store the drawing commands converted from the path and terminator data item pairs in a database file.

These aspects and other embodiments may include one or more of the following features. The industry standard may comprise the ARINC 424 standard. The drawing commands may be generated based on a current path and terminator data item pair, a previous path and terminator data item pair, and a next path and terminator data item pair. The one or more processors may be configured to generate the drawing commands by determining the course difference between a previous leg and a current leg. The one or more processors may be configured to define a curve drawing command, a line drawing command, and a point drawing command if the course difference is greater than a threshold level of thirty degrees. The one or more processors may be configured to define a line drawing command and a point drawing command and not a curve drawing command if the course difference is not greater than a threshold level of thirty degrees. The one or more processors may be configured to define a curve drawing command by defining a curve start position, a curve end position, and a curve center position. The one or more processors are configured to define a line drawing command by defining a line start position and a line end position. The curve start position may be a runway position or the end position of a previous drawing command. The line start position may be the curve end position.

In another embodiment, a system for drawing an image of a procedure route is provided. The system comprises a database system for storing industry standard drawing commands in one or more files wherein the drawing commands are configured to cause a computing device to draw an image of a procedure route on a display device. The drawing commands are generated from a processing environment comprising one or more processors configured to generate the drawing commands and store the drawing commands in the one or more files in the database system. The one or more processors are configured to retrieve a source data file containing flight path data formatted in accordance with an industry standard wherein the flight path data comprises a plurality of path data items and a plurality of terminator data items, the path data items and the terminator data items are arranged in pairs as a plurality of path and terminator data item pairs, and the path and terminator data item pairs have a specific order. The one or more processors are further configured to convert, without using operational aircraft data, each path and terminator data item pair in the source data file to one or more drawing commands comprising one or more of a point command, a line command, or a curve command wherein the point command when executed causes the display of a point on a display system, the line command when executed causes the display of a line on the display system, and the curve command when executed causes the display of a curve on the display system. The one or more processors are further configured to store the drawing commands converted from the path and terminator data item pairs in a database file. The system further comprises a display processor configured to retrieve the drawing commands from the database system and execute the drawing commands to display the procedure route on the display device.

These aspects and other embodiments may include one or more of the following features. The display may comprise an aircraft cockpit display. The display processor may be configured to display the terminal chart on an aircraft while in flight.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of generating a database of terminal charts of procedure routes from standard aircraft navigation data, the method comprising:

retrieving a source data file containing flight path data formatted in accordance with an industry standard, the flight path data comprising a plurality of path data items and a plurality of terminator data items, the path data items and the terminator data items arranged in pairs as a plurality of path and terminator data item pairs, the path and terminator data item pairs having a specific order;

converting, without using operational aircraft data, a plurality of path and terminator data item pairs in the source data file to a plurality of drawing commands comprising a plurality of a point command, a line command, or a curve command, the point command when executed causes the display of a point on a display system, the line command when executed causes the display of a line on the display system, and the curve command when executed causes the display of a curve on the display system, wherein the choice of drawing commands is determined based on a consideration of the current path and terminator data item pair, the previous path and terminator data item pair, and the next path and terminator data item pair, wherein the number and type of drawing commands depends on the type of path and terminator data item pairs; and storing the drawing commands converted from the path and terminator data item pairs in a database file, wherein the drawing commands in the database file when executed by a display processor causes the display processor to display a terminal chart for a procedure route corresponding to the flight path data in the source data file;

wherein the drawing commands in the database file are configured to enable the display processor to display the terminal chart without the generation of drawing commands by the display processor.

2. The method of claim 1 wherein converting a plurality of path and terminator data item pairs to one or more drawing commands comprises converting a path and terminator data item pair in the source data file to a set of drawing commands for that path and terminator data item pair, the converting including selecting a first predetermined subset of available commands for each type of path and terminator data item pair, adding a second predetermined subset of available commands if the course difference from the previous leg is less than a first threshold level, adding a third predetermined subset of available commands if the course difference from the previous leg is greater than a second threshold level, and adding fourth predetermined subset of available commands if the course difference to the next leg is greater than a third threshold level.

3. The method of claim 2 wherein the industry standard is ARINC 424 and wherein the first predetermined subset of available commands comprises a point drawing command and a curve drawing command for each of Arc to a Fix (AF) and Constant Radius Arc (RF) path and terminator pairs.

4. The method of claim 2 wherein the industry standard is ARINC 424 and wherein the first predetermined subset of available commands comprises a point drawing command and a line drawing command for each of Course to an Altitude (CA), Course to a DME Distance (CD), Course to a Fix (CF), Course to an Intercept (CI), Course to a Radial Termination (CR), Direct to a Fix (DF), Fix to an Altitude (FA), From a Fix for a Distance (FC), From a Fix to a Manual termination (FM), Heading to an Altitude (VA), Heading to a DME Distance (VD), Heading to an Intercept (VI), Heading to a Manual Termination (VM), and Heading to a Radial Termination (VR) path and terminator pairs.

5. The method of claim 2 wherein the industry standard is ARINC 424 and wherein the first predetermined subset of available commands comprises a point drawing command and a holding pattern drawing command for each of Holding to Altitude Termination (HA), Holding to Single circuit terminating at the fix (HF), and Holding to Manual Termination (HM) path and terminator pairs.

6. The method of claim 2 wherein the industry standard is ARINC 424 and wherein the first predetermined subset of available commands comprises a point drawing command and a procedure turn drawing command for a Procedure Turn (PI) path and terminator pair.

7. The method of claim 2 wherein the industry standard is ARINC 424 and wherein the first predetermined subset of available commands comprises a point drawing command for each of From a Fix to a DME Distance (FD), Initial Fix (IF), and Track to a Fix (TF) path and terminator pairs.

8. The method of claim 2 wherein, except for a From a Fix to a DME Distance (FD) and a Track to a Fix (TF) path and terminator pairs, the second predetermined subset of available commands comprises an empty set.

9. The method of claim 2 wherein, for a Course to a Radial Termination (CR), Fix to an Altitude (FA), Heading to an Altitude (VA), and Heading to a Radial Termination (VR) path and terminator pairs, the fourth predetermined subset of available commands comprises a curve command.

10. The method of claim 2 wherein, for a From a Fix to a DME Distance (FD) and a Track to a Fix (TF) path and terminator pairs, the second predetermined subset of available commands comprises a line command and the third predetermined subset of available commands comprises a curve command.

11. A system for generating a database of terminal charts of procedure routes from standard aircraft navigation data, the system comprising:
  a database system for storing industry standard drawing commands in one or more files, the drawing commands being configured to cause a computing device to draw an image of a procedure route on a display device;
  a processing environment comprising one or more processors configured to generate the drawing commands and store the drawing commands in the one or more files in the database system, the one or more processors configured to:
    retrieve a source data file containing flight path data formatted in accordance with an industry standard, the flight path data comprising a plurality of path data items and a plurality of terminator data items, the path data items and the terminator data items arranged in pairs as a plurality of path and terminator data item pairs, the path and terminator data item pairs having a specific order;
    convert, without using operational aircraft data, a plurality of path and terminator data item pairs in the source data file to a plurality of drawing commands comprising a plurality of a point command, a line command, or a curve command, the point command when executed causes the display of a point on a display system, the line command when executed causes the display of a line on the display system, and the curve command when executed causes the display of a curve on the display system, wherein the choice of drawing commands is determined based on a consideration of the current path and terminator data item pair, the previous path and terminator data item pair, and the next path and terminator data item pair, wherein the number and type of drawing commands depends on the type of path and terminator data item pairs; and
    store the drawing commands converted from the path and terminator data item pairs in a database file, wherein the drawing commands in the database file when executed by a display processor causes the display processor to display a terminal chart for a procedure route corresponding to the flight path data in the source data file;
  wherein the drawing commands in the database file are configured to enable the display processor to display the terminal chart without the generation of drawing commands by the display processor.

12. The system of claim 11 wherein to convert a plurality of path and terminator data item pairs to one or more drawing commands, the one or more processors are configured to convert a path and terminator data item pair in the source data file to a set of drawing commands for that path and terminator data item pair, the converting including selecting a first predetermined subset of available commands for each type of path and terminator data item pair, adding a second predetermined subset of available commands if the course difference from the previous leg is less than a first threshold level, adding a third predetermined subset of available commands if the course difference from the previous leg is greater than a second threshold level, and adding fourth predetermined subset of available commands if the course difference to the next leg is greater than a third threshold level.

13. The system of claim 12 wherein the industry standard is ARINC 424 and wherein the first predetermined subset of available commands comprises a point drawing command and a curve drawing command for each of Arc to a Fix (AF) and Constant Radius Arc (RF) path and terminator pairs.

14. The system of claim 12 wherein the industry standard is ARINC 424 and wherein the first predetermined subset of available commands comprises a point drawing command and a line drawing command for each of Course to an Altitude (CA), Course to a DME Distance (CD), Course to a Fix (CF), Course to an Intercept (CI), Course to a Radial Termination (CR), Direct to a Fix (DF), Fix to an Altitude (FA), From a Fix for a Distance (FC), From a Fix to a Manual termination (FM), Heading to an Altitude (VA), Heading to a DME Distance (VD), Heading to an Intercept (VI), Heading to a Manual Termination (VM), and Heading to a Radial Termination (VR) path and terminator pairs.

15. The system of claim 12 wherein the industry standard is ARINC 424 and wherein the first predetermined subset of available commands comprises a point drawing command and a holding pattern drawing command for each of Holding to Altitude Termination (HA), Holding to Single circuit terminating at the fix (HF), and Holding to Manual Termination (HM) path and terminator pairs.

16. The system of claim 12 wherein the industry standard is ARINC 424 and wherein the first predetermined subset of available commands comprises a point drawing command and a procedure turn drawing command for a Procedure Turn (PI) path and terminator pair.

17. The system of claim 12 wherein the industry standard is ARINC 424 and wherein the first predetermined subset of available commands comprises a point drawing command for each of From a Fix to a DME Distance (FD), Initial Fix (IF), and Track to a Fix (TF) path and terminator pairs.

18. The system of claim 12 wherein:
except for a From a Fix to a DME Distance (FD) and a Track to a Fix (TF) path and terminator pairs, the second predetermined subset of available commands comprises an empty set; and
for the FD and TF path and terminator pairs, the second predetermined subset of available commands comprises a line command and the third predetermined subset of available commands comprises a curve command.

19. The system of claim 12 wherein, for a Course to a Radial Termination (CR), Fix to an Altitude (FA), Heading to an Altitude (VA), and Heading to a Radial Termination (VR) path and terminator pairs, the fourth predetermined subset of available commands comprises a curve command.

20. A system for generating a database of terminal charts of procedure routes from standard aircraft navigation data, the system comprising:
a database system for storing industry standard drawing commands in one or more files, the drawing commands being configured to cause a computing device to draw an image of a procedure route on a display device;
the drawing commands generated from a processing environment comprising one or more processors configured to generate the drawing commands and store the drawing commands in the one or more files in the database system, the one or more processors configured to:
retrieve a source data file containing flight path data formatted in accordance with an industry standard, the flight path data comprising a plurality of path data items and a plurality of terminator data items, the path data items and the terminator data items arranged in pairs as a plurality of path and terminator data item pairs, the path and terminator data item pairs having a specific order;
convert, without using operational aircraft data, a plurality of path and terminator data item pairs in the source data file to a plurality of drawing commands comprising a plurality of a point command, a line command, or a curve command, the point command when executed causes the display of a point on a display system, the line command when executed causes the display of a line on the display system, and the curve command when executed causes the display of a curve on the display system, wherein the choice of drawing commands is determined based on a consideration of the current path and terminator data item pair, the previous path and terminator data item pair, and the next path and terminator data item pair, wherein the number and type of drawing commands depends on the type of path and terminator data item pairs; and
store the drawing commands converted from the path and terminator data item pairs in a database file; and
a display processor configured to retrieve the drawing commands from the database system and execute the drawing commands to display the procedure route on the display device, wherein the display device comprises an aircraft cockpit display;
wherein the drawing commands in the database file when executed by the display processor causes the display processor to display on the display device a terminal chart for the procedure route corresponding to the flight path data in the source data file;
wherein the drawing commands in the database file are configured to enable the display processor to display the terminal chart without the generation of drawing commands by the display processor.

* * * * *